(12) United States Patent
Khawand et al.

(10) Patent No.: US 7,773,714 B2
(45) Date of Patent: Aug. 10, 2010

(54) METHOD AND SYSTEM FOR EMPLOYING ADAPTIVE EVENT CODES

(75) Inventors: Charbel Khawand, Miami, FL (US); Jianping Tao, Cedar Park, TX (US); John J. Vaglica, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 1744 days.

(21) Appl. No.: 10/747,844

(22) Filed: Dec. 29, 2003

(65) Prior Publication Data

US 2005/0265507 A1 Dec. 1, 2005

(51) Int. Cl.
*H04L 23/00* (2006.01)
(52) U.S. Cl. ...................... 375/377; 375/354
(58) Field of Classification Search ................ 375/354, 375/377
See application file for complete search history.

(56) References Cited

U.S. PATENT DOCUMENTS

| | | | |
|---|---|---|---|
| 5,231,699 A | | 7/1993 | Tendler |
| 5,315,589 A | | 5/1994 | Kepley et al. |
| 5,666,486 A | | 9/1997 | Alfieri et al. |
| 5,809,091 A | | 9/1998 | Barrow |
| 5,991,280 A | | 11/1999 | Ichiyoshi |
| 6,028,849 A | | 2/2000 | Niot et al. |
| 6,112,085 A | * | 8/2000 | Garner et al. ............... 455/428 |
| 6,125,404 A | * | 9/2000 | Vaglica et al. ............... 713/375 |
| 6,621,806 B1 | | 9/2003 | Keller et al. |
| 6,657,977 B1 | * | 12/2003 | Khawand et al. ............ 370/305 |
| 7,537,167 B1 | * | 5/2009 | Miller .................... 235/472.01 |
| 2003/0002537 A1 | | 1/2003 | Schaller |
| 2004/0162061 A1 | * | 8/2004 | Abrol et al. ............... 455/414.1 |
| 2004/0204032 A1 | * | 10/2004 | Hisano et al. ............ 455/552.1 |
| 2004/0229604 A1 | * | 11/2004 | Fong et al. ............... 455/422.1 |

FOREIGN PATENT DOCUMENTS

| | | |
|---|---|---|
| EP | 0959575 A1 | 11/1999 |
| JP | 02-245829 | 10/1990 |
| JP | 09-171502 | 6/1997 |
| WO | 0176177 A2 | 10/2001 |
| WO | WO 01/76177 A2 | 10/2001 |

OTHER PUBLICATIONS

U.S. Appl. No. 10/147,781, Khawand et al.

(Continued)

*Primary Examiner*—Juan A Torres
(74) *Attorney, Agent, or Firm*—Larry G. Brown; Sylvia Chen (57) ABSTRACT

The invention concerns a method (500) for employing adaptive event codes. The method includes the steps of generating (512) at least one adaptive event code in which the adaptive event code corresponds to a preexisting event code, storing (514) the adaptive event code in at least one table (154, 156), running (516) the table in which the adaptive event codes are at least initially disabled and enabling (522) the adaptive event code in response to a system event in which the preexisting event code that corresponds to the enabled adaptive event code is executed (526). The method can further include the step of ignoring (518) the adaptive event codes during the running step when the adaptive event codes are disabled.

21 Claims, 5 Drawing Sheets

OTHER PUBLICATIONS

U.S. Appl. No. 10/359,862, Khawand et al.
Patent Cooperation Treaty; "International Search Report"; International Application No. PCT/US04/43799; May 27, 2005; 2 pages.
Korean Intellectual Property Office; "Notice of Preliminary Rejection"; Application No. 10-2006-7013099; Jun. 21, 2007; 4 pages.
European Patent Office; "Supplementary European Search Report"; Application No./Patent No. 04815800.0-2415 (PCT/US2004043799); Oct. 25, 2007; 3 pages.
Japanese Patent Office, "Notifications of Reaons for Rejection" for Japanese Pat. Appln. No. 2006-547527, Jun. 15, 2010, pp. 1-2.

* cited by examiner

METHOD AND SYSTEM FOR EMPLOYING ADAPTIVE EVENT CODES

BACKGROUND OF THE INVENTION

1. Field of the Invention

This invention relates in general to communications systems and more particularly to methods for synchronizing events between communications devices.

2. Description of the Related Art

A layer one timer is a peripheral that aids in synchronizing over-the-air events with the frame event timing of a base station. One of the features of a layer one timer is an event table, which can support, for example, one or more macro tables. As is known in the art, a macro table can be used to define a fixed sequence of events, such as for a receive or transmission burst or for use as a signal strength measurement. Macro tables are considered useful because they minimize the amount of software interaction required with the layer one timer.

To allow a sequence of events to be repeated, a loop structure can be implemented for a macro table. This loop structure is similar to a software loop, as events inside the macro table are repeated based on a loop counter value. This technique can free the system's software from reprogramming the same macro table several times during the repetition of an over-the-air activity. Unfortunately, the loop counter value must be known before the macro table is accessed, and this value cannot be changed once the macro table is committed to run. Moreover, the macro table cannot be reprogrammed while it is running, as an attempt to do so may cause an internal bus error. These shortcomings may present a problem if it is desired to terminate the macro table early, such as when a system change occurs that may prompt a response in the unit containing the layer one timer. The macro table must run through each loop iteration until the loop counter value is reached, which wastes both time and battery life, if applicable.

SUMMARY OF THE INVENTION

The present invention concerns a method for employing adaptive event codes. The method includes the steps of generating at least one adaptive event code in which the adaptive event code corresponds to a preexisting event code, storing the adaptive event code in at least one table, running the table in which the adaptive event codes are at least initially disabled and enabling the adaptive event code in response to a system event in which the preexisting event code that corresponds to the enabled adaptive event code is executed. The method can further include the step of ignoring the adaptive event codes during the running step when the adaptive event codes are disabled.

In one arrangement, the adaptive event codes can be stored in a macro table or a frame table. Also, the enabling the adaptive event code step can include the step of setting at least one enabling bit to enable the adaptive event code. The enabling bit can be stored in an enabling register. The method can further include the step of retrieving from an adaptive event code register the corresponding preexisting event code that is to be executed. As an example, the adaptive event code, the table and the preexisting event code can be part of a timer. The timer can be part of a communications device and assists in synchronizing the operation of the communications device with a base station. In one particular example, the table can have a loop counter value, and the step of running the table can include the step of repeatedly executing the table based on the loop counter value in which the preexisting event code can be a command for stopping the running of the table.

The present invention also concerns a machine readable storage having stored thereon a computer program having a plurality of code sections executable by a machine. The code sections cause the machine to perform the steps of generating at least one adaptive event code in which the adaptive event code corresponds to a preexisting event code, storing the adaptive event code in at least one table, running the table in which the adaptive event codes are at least initially disabled and enabling the adaptive event code in response to a system event in which the preexisting event code that corresponds to the enabled adaptive event code is executed.

The present invention also concerns a system for employing adaptive event codes. The system includes a processing unit and a timer having at least one table. The processing unit is programmed to generate at least one adaptive event code in which the adaptive event code corresponds to a preexisting event code, store the adaptive event code in the table, run the table in which the adaptive event codes are at least initially disabled, enable the adaptive event code in response to a system event and execute the preexisting event code that corresponds to the enabled adaptive event code. The system also includes suitable software and circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
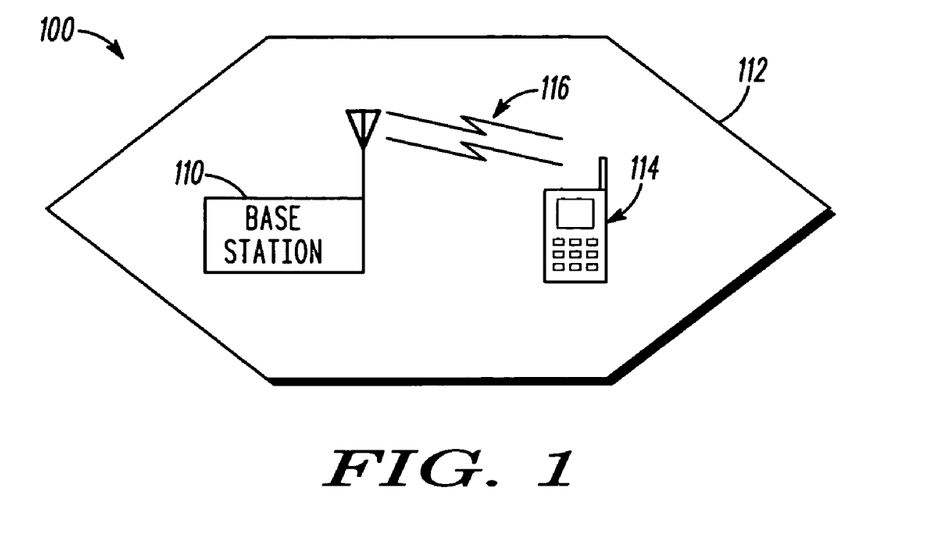
FIG. 1 illustrates an example of a system for employing adaptive event codes in accordance with the inventive arrangements.

Referring to FIG. 1, a system 100 for employing adaptive event codes is shown. It is understood, however, that the system 100 is merely used to describe the inventive arrangements and is in no way limiting, as the invention can be practiced in other suitable systems. In this example, the system 100 can include a base station 110 that provides communications resources in a serving cell or serving area 112. The system 100 can also include one or more electronic devices, such as any number of communication devices 114. As an example and without limitation, the communication device 114 can be a cellular telephone, a two-way radio, a personal digital assistant or a messaging device. The communication device 114, when it is in the serving area 112, can communicate with the base station 110 over, for example, a wireless communications link 116.

Figure 2:
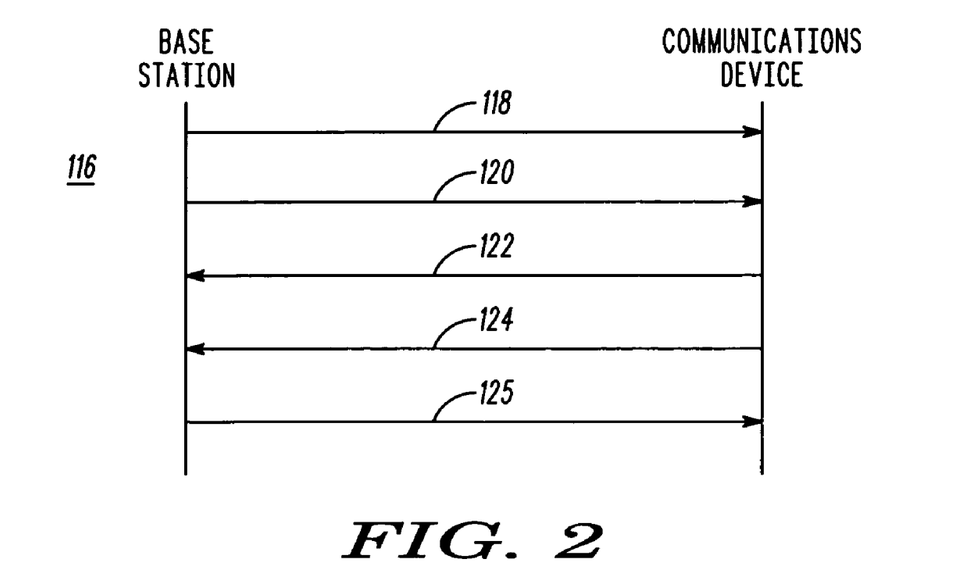
FIG. 2 illustrates an example of a wireless communications link in accordance with the inventive arrangements.

In one arrangement, referring to FIG. 2, the wireless communications link 116 can include a broadcast control channel (BCCH) 118, a downlink traffic channel (DTCH) 120, an uplink traffic channel (UTCH) 122, a random access channel (RACH) 124 and an acquisition indicator channel (AICH) 125. As is known in the art, the base station 110 can transmit voice and data signals over the DTCH 120 to the communication device 114, and the communication device 114 can transmit such signals to the base station 110 over the UTCH 122. The communication device 114 can request communications resources over the RACH 124, and the base station 110 can respond to this request over the AICH 125. An example of the communication device 114 negotiating with the base station 110 over the RACH 124 and the AICH 125 will be described later.

Figure 3:
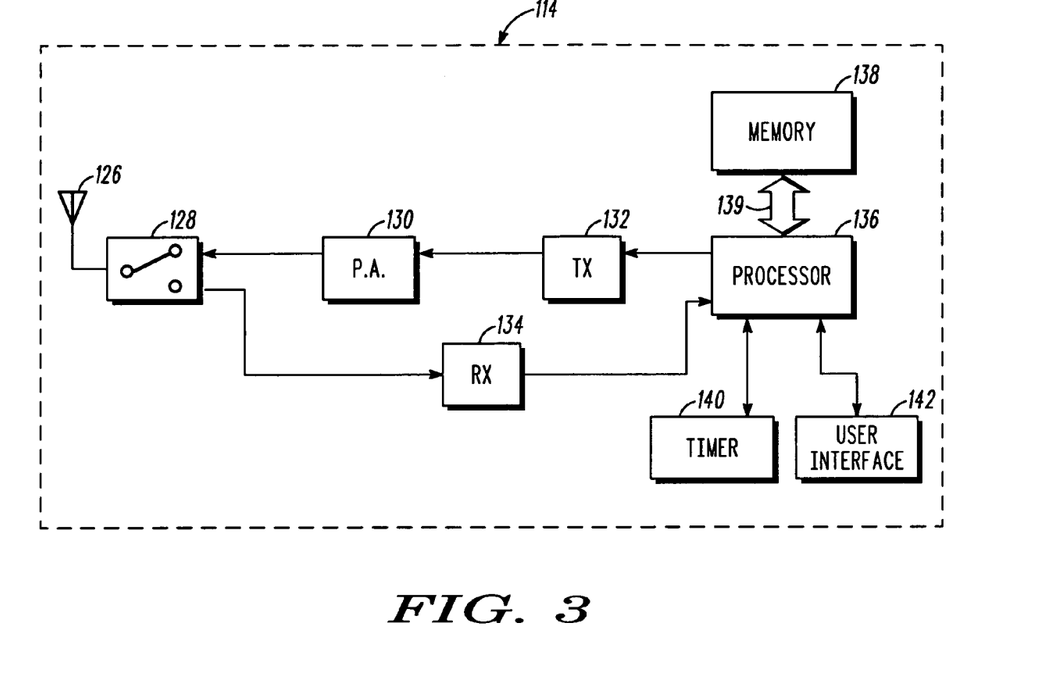
FIG. 3 illustrates a block schematic diagram of a communication device in accordance with the inventive arrangements.

Referring to FIG. 3, a block schematic diagram of the communication device 114 is shown. In one arrangement, the communication device 114 can have an antenna 126, an antenna switch 128, a power amplifier 130, a transmitter 132, a receiver 134, a processor 136, a memory 138, a timer 140 and a user interface 142. The antenna 126 can transmit and receive radio frequency (RF) electromagnetic waves and can be coupled to an antenna switch 128. The antenna switch 128 can be operated to couple alternately the antenna switch 128 to the power amplifier 130 and the receiver 134. The receiver 134 can demodulate the received RF signal and can digitize the signal before forwarding it to the processor 136. The processor 136 can also forward digital signals to the transmitter 132 for modulation, and the power amplifier 130 can amplify the modulated signals before sending the signals to the antenna 126 for broadcast.

The processor 136 can execute software stored in the memory 138, which can be accessed over a bus 139. In addition, the processor 136 can operate the user interface 142, which can be any component suitable for displaying, broadcasting information to or receiving information from a user, such as a display, a speaker, a microphone or a keypad. The timer 140 can interact with the processor 136 and can perform timing or synchronizing functions to allow the processor 136 to execute processes or events at appropriate times. In one particular example, the timer 140 can assist in synchronizing the operation of the communication device 114 (see FIG. 1) with the base station 110 (see also FIG. 1).

Figure 4:
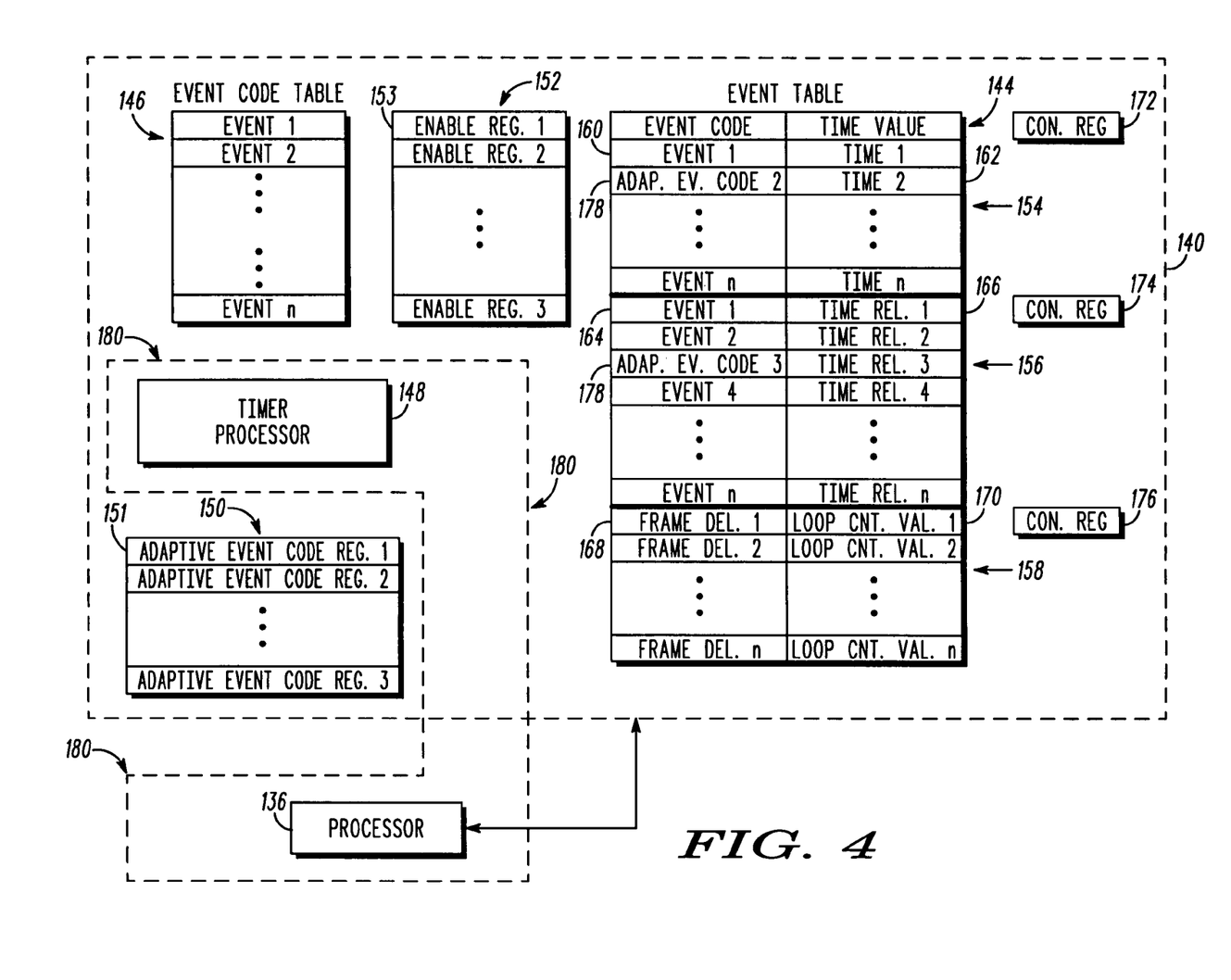
FIG. 4 illustrates a timer that can be part of the communication device of FIG. 3 in accordance with the inventive arrangements.

Referring to FIG. 4, an example of a timer 140 is shown. In this example, the timer 140 can include an event table 144, an event code table 146, a timer processor 148, an adaptive event code register stack 150 having one or more adaptive event code registers 151 and an enabling register stack 152 having one or more enabling registers 153. The event code table 146 can define any suitable number of events, one or more of which may be stored in the event table 144. In one arrangement, the event table 144 can support one or more one or more frame tables 154, one or more macro tables 156 and one or more parameter tables 158. As an example, the frame table 154 can include one or more event codes 160 and one or more corresponding time values 162. The event codes 160 specify what action the timer 140, e.g., the timer processor 148, is to execute, and the corresponding time values 162 define the event's execution time relative to the start of a channel frame, as is known in the art. As explained earlier, the event code 160 can be obtained from the event code table 146.

The macro table 156, which can be used to define a fixed sequence of events, can also include one or more event codes 164 and one or more corresponding time relative values 166. Like the event codes 160, the event codes 164 can specify the action that the timer processor 148 is to execute. Additionally, the corresponding time relative values 166 can define the time at which its corresponding event code 164 should be executed based on a delay from a previous event. The event codes 164 can also be obtained from the event code table 146. The parameter table 158 can include one or more frame delay values 168 and one or more loop count values 170. The frame delay values 168 can be used to set the pulse width of a signal, and the loop count values 170 can be used to repeat the execution or running of a macro table 156.

The frame table 154, the macro table 156 and the parameter table 158 can have respective configuration registers 172, 174 and 176. Each of these configuration registers 172, 174 and 176 can include start and end pointers for respectively defining the first and last entries of a corresponding frame table 154, a macro table 156 and a parameter table 158. Although not shown, the frame table 154 and the macro table 156 may also include registers for selecting successive tables once a previous table is executed.

In another arrangement of the invention, one or more adaptive event codes 178 may be programmed into, for example, the frame table 154 or the macro table 156. These adaptive event codes 178 may have corresponding time values 162 or time relative values 166 and can have an enabled state and a disabled state. In the disabled state, the adaptive event codes 178 can be treated like a null code, and the timer processor 148 can ignore the adaptive event codes 178. When enabled, however, the adaptive event codes 178 can be treated like a conventional event code and can instruct the timer processor 148 to take a particular action. That is, the adaptive event codes 178 can correspond to a conventional event code, such as event codes 160, 164, and when enabled, the actions defined by these event codes can be performed. The event codes that correspond to the adaptive event codes 178 can be referred to as preexisting event codes or corresponding preexisting event codes.

In one arrangement, the actions defined by an adaptive event code 178 can be stored in an adaptive event code register 151 of the adaptive event code register stack 150. Thus, when an adaptive event code 178 is enabled, the timer processor 148 can retrieve instructions from the appropriate adaptive event code register 151. Additionally, the bit(s) for enabling an adaptive event code 178 can be stored in an enabling register 153 of the enabling register stack 152. These bit(s) can be set to enable or disable the adaptive event codes 178. Also, as an example, the actions defined by the adaptive event codes 178 can be obtained from the event code table 146.

In another arrangement, the processor 136 (see also FIG. 3) and the timer processor 148 can be part of a processing unit 180, which is represented by the dashed outline in FIG. 4. In this example, the processing unit 180 can include two discrete processors, namely the processor 136 and the timing processor 148. Nevertheless, it is understood that the processing unit 180 can include merely one processor or more than two processors for carrying out operations in accordance with the inventive arrangements.

Figure 5:
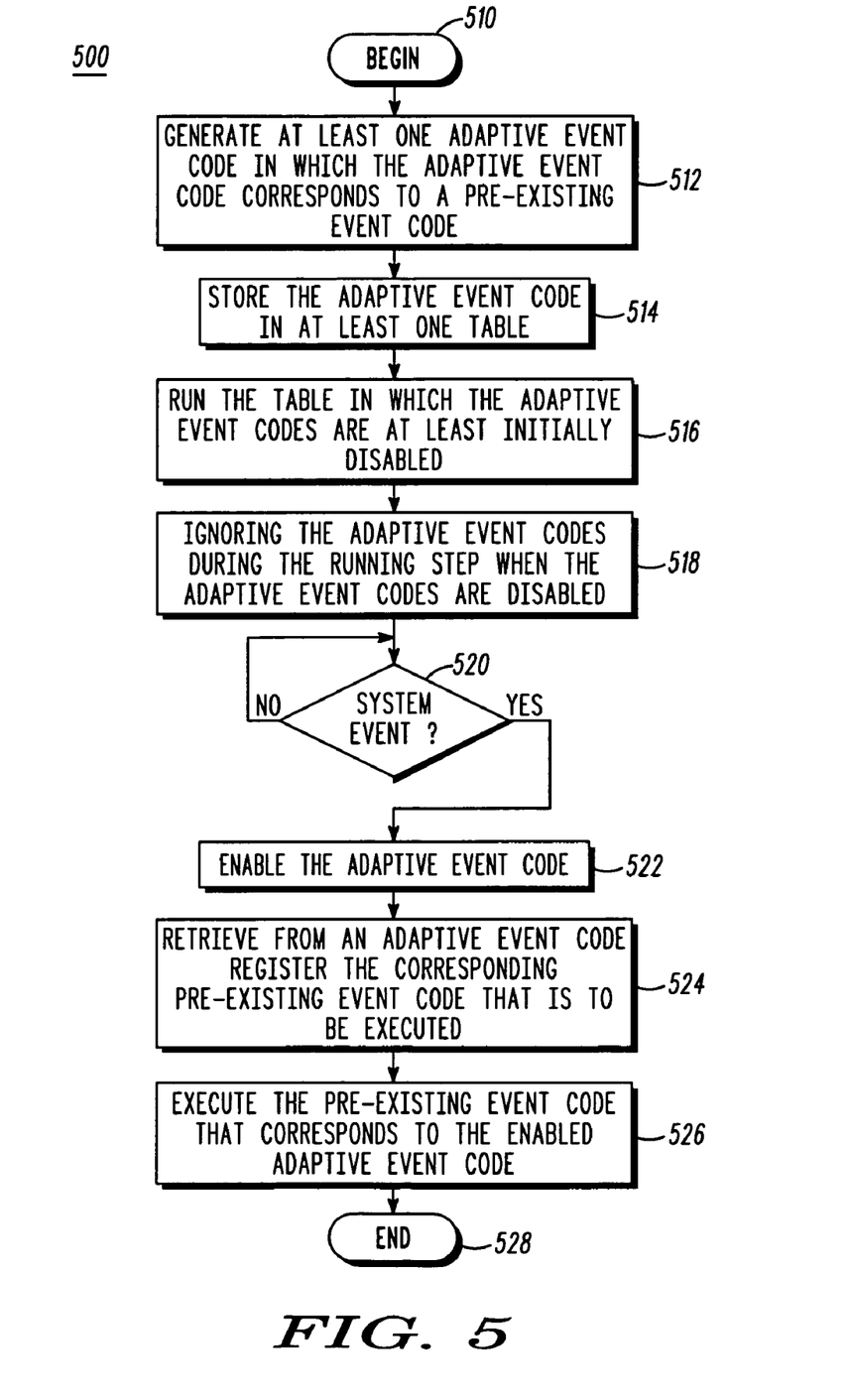
FIG. 5 illustrates a method for employing adaptive event codes in accordance with the inventive arrangements.

Referring to FIG. 5, a method 500 for employing adaptive event codes is shown. Reference will be made to FIG. 4, when describing the method 500 of FIG. 5, although it is understood that the method 500 can be practiced in any other suitable component or system. Moreover, reference will be made to FIG. 6, which shows a negotiation procedure between a communication device and a communications network, to describe one example of how employing adaptive event codes in accordance with the method 500 of FIG. 5 may be useful.

Referring to FIG. 5, at step 510, the method 500 can begin. At step 512, at least one adaptive event code can be generated in which the adaptive event code corresponds to a preexisting event code. These adaptive event codes can be stored in at least one table, as shown at step 514. For example, referring to FIG. 4, the processor 136 of the processing unit 180 can be used to generate one or more of the adaptive event codes 178. These adaptive event codes 178 can correspond to preexisting event codes defined in the event code table 146, such as event codes 160, 164. An adaptive event code 178 can correspond to a preexisting event code when the preexisting event code will be executed if the adaptive event code 178 is enabled. As noted earlier, these adaptive event codes 178 can be stored in, for example, the frame table 154 or the macro table 156.

Referring back to the method 500 of FIG. 5, at step 516, the table in which the adaptive event codes are stored can be run or executed in which the adaptive event codes are at least initially disabled. In addition, the adaptive event codes can be ignored during the running step 516 when the adaptive event codes are disabled, as shown in step 518. For example, referring once again to FIG. 4, the timing processor 148 can execute a frame table 154. During this execution, the timer processor 148 may call a macro table 156. As is known in the art, the macro table 156 may have a loop count value 170 associated with the macro table 156, and when the macro table 156 is called, this loop count value 170 may be loaded from the parameter table 158.

Figure 6:
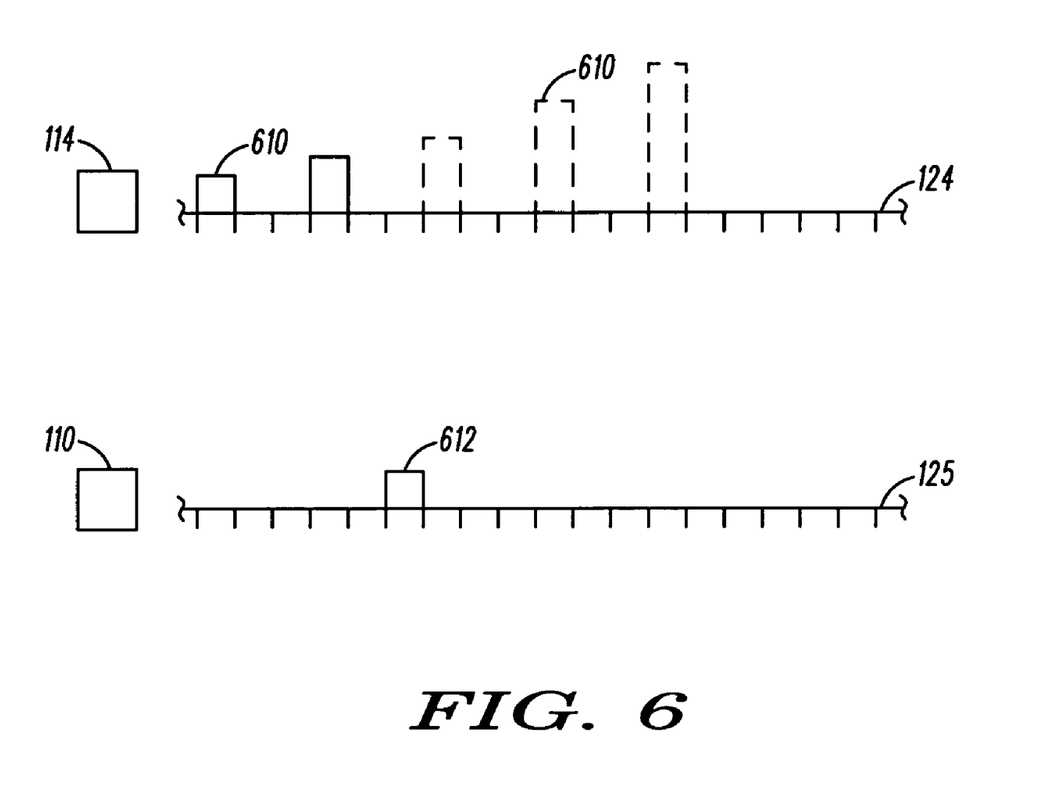
FIG. 6 illustrates an example of a transmission over a random access channel and an acquisition indicator channel in accordance with the inventive arrangements.

Referring now to FIGS. 4 and 6, an example of when a macro table 156 may be called is when a device housing the timer 140 requests communications services from a network. More specifically, the communications device 114 may request services from the base station 110 by sending several access preambles 610 over the RACH 124. The execution sequence involved with this process may be associated with a macro table 156, and the number of access preambles 610 that are transmitted can be based on the loop count value 170 that is loaded from the parameter table 158.

Referring back to the method 500 of FIG. 5, at decision block 520, it can be determined whether a system event has occurred. A system event can be any action taken by the unit housing the timer 140 or an action taken by a component with which that unit is associated. For example, referring back to FIGS. 4 and 6, the base station 110 can transmit to the communication device 114 an acquisition indicator 612 over the AICH 125 that acknowledges the request from the communications device 114. Once it receives the acquisition indicator 612, the communication device 114 can decode this acknowledgement and can proceed to cease the transmission over the RACH 124. The communication device 114 can transmit further information to the base station 110 over other suitable channels.

Referring back to FIG. 5 once again, if no system event has occurred, the method 500 will resume at the decision block 520 If a system event has occurred, however, one or more adaptive event codes can be enabled, as shown at step 522. At step 524, the corresponding preexisting event code that corresponds to the enabled adaptive event code and that is to be executed can be retrieved from an adaptive event code register. Further, at step 526, the preexisting event code that corresponds to the enabled adaptive event code can be executed. Finally, the method 500 can end at step 528.

As an example, referring to FIGS. 4 and 6, the receipt of the acquisition indicator 612 by the communication device 114 can be a system event. In response, the processor 136 of the processing unit 180 can set at least one enabling bit to enable one or more adaptive event codes 178. As noted earlier, these enabling bit(s) can be stored in one or more enabling registers 153. When enabled, the timer processor 148 can execute the adaptive event code 178 by retrieving from the relevant adaptive event code register 151 and executing the preexisting event code, e.g., event codes 160, 164, that corresponds to the adaptive event code 178.

Continuing with the example described above, the preexisting event code can be a command that instructs the timer processor 148 to stop running the macro table 156, which can cause the processor 136 of the processing unit 180 to cease the repeated transmission of the access preambles 610. As an example, the adaptive event code 178 can be equated to an end of macro event code and can be placed in an appropriate location inside the macro table 156. Thus, once the communication device 114 receives the acquisition indicator 612, the communication device 114 can stop sending the access preambles 610. If no adaptive event codes 178 were employed, the communication device 114 would continue to transmit the access preambles 610 in accordance with the loop count value 170 associated with the macro table 156, even if the acquisition indicator 612 was received. The unnecessary access preambles 610 are represented by the dashed outlines of FIG. 6. Accordingly, the invention can improve the accuracy of responding to such intricate and real-time communication details by lessening the interaction of software. The invention can also improve the efficiency of the communication device 114 and can increase the life of the battery for the device 114.

It is important to note that the invention is in no way limited to the examples described above. For instance, the invention is not limited to use in the systems or components illustrated in FIGS. 1-4. In fact, the invention can be implemented in any suitable system or component in which the adaptive event codes may be employed. Moreover, the invention is in no way limited to improving the efficiency of the negotiation of service between a communication device and a network. Other procedures or processes that may benefit from the above-description are within contemplation of the inventive arrangements.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A method for employing adaptive event codes, comprising the steps of:
    generating at least one adaptive event code, wherein the adaptive event code corresponds to a preexisting event code;
    storing the adaptive event code in at least one table, wherein the table also stores conventional event codes that specify executable actions;
    running the table, wherein the adaptive event codes are at least initially disabled; and
    enabling, using a processing unit, the adaptive event code in response to a system event, wherein the preexisting event code that corresponds to the enabled adaptive event code is executed such that the adaptive event code is treated like a conventional event code.

2. The method according to claim 1, further comprising the step of ignoring the adaptive event codes during the running step when the adaptive event codes are disabled.

3. The method according to claim 1, wherein the adaptive event codes are stored in a macro table or a frame table.

4. The method according to claim 1, wherein the enabling the adaptive event code step comprises the step of setting at least one enabling bit to enable the adaptive event code.

5. The method according to claim 4, wherein the enabling bit is stored in an enabling register.

6. The method according to claim 1, further comprising the step of retrieving from an adaptive event code register the corresponding preexisting event code that is to be executed.

7. The method according to claim 1, wherein the adaptive event code, the table and the preexisting event code are part of a timer.

8. The method according to claim 7, wherein the timer is part of a communications device and assists in synchronizing the operation of the communications device with a base station.

9. The method according to claim 1, wherein the table has a loop counter value and the step of running the table comprises the step of repeatedly executing the table based on the loop counter value, wherein the preexisting event code is a command for stopping the running of the table.

10. A machine readable storage device having stored thereon a computer program having a plurality of code sections executable by a machine for causing the machine to perform the steps of:
    generating at least one adaptive event code, wherein the adaptive event code corresponds to a preexisting event code;
    storing the adaptive event code in at least one table, wherein the table also stores conventional event codes that specify executable actions;
    running the table, wherein the adaptive event codes are at least initially disabled; and
    enabling the adaptive event code in response to a system event, wherein the preexisting event code that corresponds to the enabled adaptive event code is executed such that the adaptive event code is treated like a conventional event code.

11. The machine readable storage device according to claim 10, wherein the executable code sections further cause the machine to perform the step of ignoring the adaptive event codes during the running step when the event codes are disabled.

12. The machine readable storage device according to claim 10, wherein the executable code sections further cause the machine to perform the step of setting at least one enabling bit to enable the adaptive event code.

13. The machine readable storage device according to claim 10, wherein the executable code sections further cause the machine to perform the step of retrieving from an adaptive event code register the corresponding preexisting event code that is to be executed.

14. A system for employing adaptive event codes, comprising:
    a processing unit; and
    a timer having at least one table, wherein the processing unit is programmed to:
        generate at least one adaptive event code, wherein the adaptive event code corresponds to a preexisting event code
        store the adaptive event code in the table, wherein the table also stores conventional event codes that specify executable actions;
        run the table, wherein the adaptive event codes are at least initially disabled;
        enable the adaptive event code in response to a system event; and
        execute the preexisting event code that corresponds to the enabled adaptive event code such that the adaptive event code is treated like a conventional event code.

15. The system according to claim 14, wherein the processing unit is further programmed to ignore the adaptive event codes during the running of the table when the event codes are disabled.

16. The system according to claim 14, wherein the adaptive event codes are stored in a macro table a frame table.

17. The system according to claim 14, wherein the processing unit is further programmed to set at least one enabling bit to enable the adaptive event code.

18. The system according to claim 17, further comprising an enabling register, wherein the processing unit is further programmed to store the enabling bit in the enabling register.

19. The system according to claim 14, further comprising an adaptive event code register and wherein the processing unit is further programmed to retrieve from the adaptive event code register the corresponding preexisting event code that is to be executed.

20. The system according to claim 14, wherein the timer and the processing unit are part of a communications device and wherein the timer assists in synchronizing the operation of the communications device with a base station.

21. The system according to claim 14, wherein the table has a loop counter value and the processing unit is further programmed to execute repeatedly the table based on the loop counter value, wherein the preexisting event code is a command to direct the processing unit to stop running the table.

* * * * *